Feb. 22, 1944.  G. A. TINNERMAN  2,342,170
FASTENING DEVICE
Filed July 24, 1941
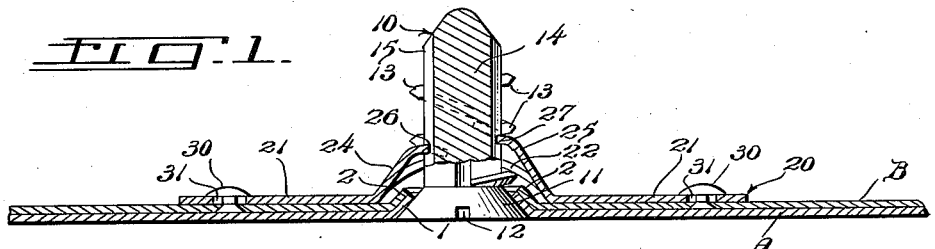
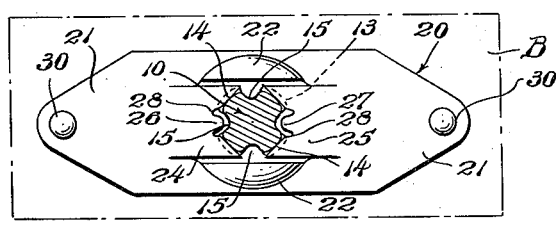
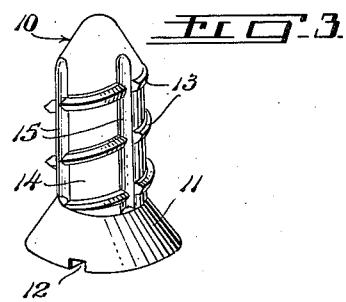
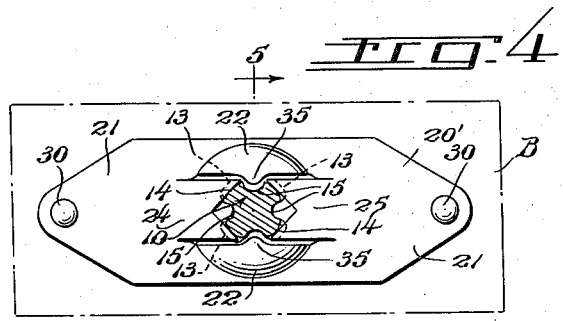
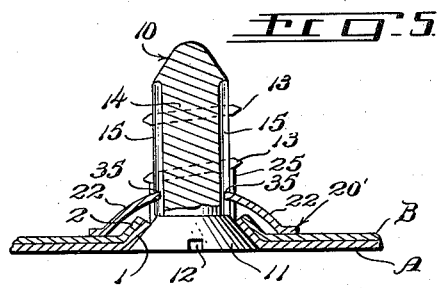
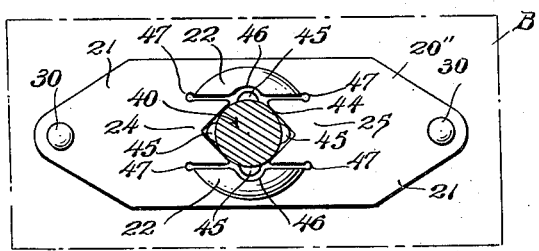
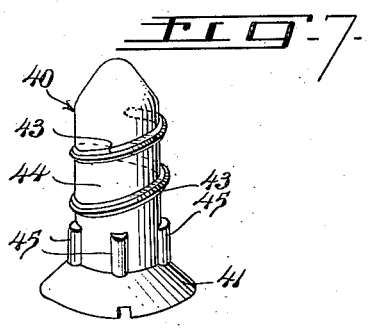
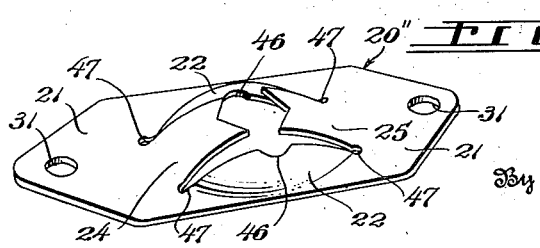
Inventor
GEORGE A. TINNERMAN
By H. G. Lombard
Attorney Patented Feb. 22, 1944

2,342,170

UNITED STATES PATENT OFFICE 2,342,170

FASTENING DEVICE

George A. Tinnerman, Cleveland, Ohio, assignor to Tinnerman Products, Inc., Cleveland, Ohio, a corporation of Ohio Application July 24, 1941, Serial No. 403,919

15 Claims. (Cl. 24—221)

This invention relates in general to fastening devices of the character embodying cooperating spring locking plate and stud fastening members designed for easily and quickly securing the parts of an assembly under a combined spring pressure and self-locking action capable of preventing accidental loosening or release of the fastening members under severe conditions of vibration, shock, and the like.

More particularly, the invention is directed to an improved form of a fastening device comprising a sheet metal locking plate member having a spring nut fastening relation with a cooperating bolt or screw fastening in a manner to permit the parts of an assembly to be easily and quickly secured in a positive, self-locking action and yet capable of being readily released without mutilating or distorting the fastening members such that the parts of the assembly may be disassociated and resecured thereby as often as may be necessary or desirable.

While the fastening device of the present invention is one of general utility in that it may be readily designed for use in a wide range and variety of installations, it is particularly useful and advantageous in assemblies wherein a self-locking connection is required for releasably and resiliently clamping together two or more superposed or juxtaposed parts under continuously effective spring pressure in a manner to eliminate or absorb the effects of any vibratory motion, and the like, which might possibly cause a loosening of the members of the fastening device from tightened fastening position.

In this relation, the present invention has particular application and use in assemblies for detachably locking in place panel-like members such as cover plates, closure panels and similar parts which cover or conceal the service openings in the body of an aeroplane or motor vehicle, as, for example, in a cowling assembly or the mounting of a radiator casing, hood, or the like.

A primary object of the invention is for the provision of a fastening device comprising cooperating sheet metal locking plate and bolt or screw fastening members having complementary notch and detent locking elements adapted to provide a positive, self-locking and clamped connection of the parts secured under continuously effective spring tension which not only withstands loosening or displacement of such parts, but also prevents any possible accidental release of the members of the fastening device under extreme conditions of vibratory motion, jarring effects, and the like.

A further object of the invention is to provide a fastening device of the kind described embodying a pair of cooperating fastening members having a screw threaded connection of relatively high pitch and thereby adapted to be fastened with comparatively greater speed and facility in securing the parts of an assembly under continuously effective spring force, and in a positive, self-locking action, while otherwise capable of easy and quick separation or release to permit such secured parts to be disassociated and resecured as frequently as necessary and with the same degree of effectiveness.

Still another object of the invention is to provide such a fastening device comprising cooperating spring locking plate and threaded stud fastening members having complementary lug and recess locking elements providing for a positive, self-locking fastening action, and which fastening members are of simple, inexpensive construction and capable of economical quantity production.

Present day streamlining of vehicles makes it desirable and necessary to provide the various fastening installations in such a manner that the streamlined exterior of the vehicle body will be unobstructed by any projecting portion of the stud member of the fastening device. A further, more specific object of the invention, therefore, is to provide for use in such an installation a fastening device embodying all the foregoing described characteristics and in which the stud member is receivable in an apertured countersunk portion in the parts secured in substantially flush relation with the exterior thereof and in fastening relation with the cooperating spring locking plate provided with a hub or boss seating the same in operative relation to said countersunk portion together with means for threadedly engaging the stud member in a positive, self-locking action.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a sectional view of an installation in which superposed or juxtaposed parts are secured by the improved spring locking plate and bolt fastening members of the invention;

Fig. 2 is a plan view of the installation of Fig. 1 with the bolt or screw represented in section;

Fig. 3 is a perspective view of the bolt or screw employed in Figs. 1 and 2;

Fig. 4 is a plan view similar to Fig. 2 showing another form of the spring locking plate;

Fig. 5 is a sectional view of Fig. 4 taken on line 5—5, looking in the direction of the arrows;

Fig. 6 is a plan view similar to Fig. 2 illustrating a further embodiment of the invention;

Fig. 7 is a perspective view of the bolt or screw employed in Fig. 6; and,

Fig. 8 is a perspective view of the spring locking plate shown in Fig. 6.

Generally speaking, the present invention is directed to an improved form of self-locking and separable fastening device comprising a spring locking plate member especially designed for use with a bolt or screw fastening member having a thead preferably of relatively high pitch for effecting a relatively quick fastening engagement or release of said fastening members in a minimum of time and effort. The spring locking plate fastening member is provided with thread engaging means for threadedly engaging the bolt or screw fastening member under a pronounced axial spring force as the same is advanced to tightened fastening position, while said fastening members otherwise are provided with complementary notch and detent or lug and recess locking elements designed to provide in addition, a positive, self-locking securing relation of said fastening members in tightened fastening position.

Referring now, more particularly, to the drawing, the fastening device is shown embodying a pair of cooperating fastening members comprising a rotatable bolt or screw 10 and a spring locking plate 20 adapted for cooperative fastening engagement in securing two or more complementarily fitted superposed or juxtaposed parts A, B, in an installation. Such parts may be of any suitable material with the secured portions thereof usually assuming the form of complementary plates of which part B may be termed the supporting plate comprising, for example, the body of any aeroplane adjacent a service opening therein, with part A being a portion of the cover plate secured thereto to cover such service opening but capable of being easily and quickly released and removed, if desired, to permit access to such service opening for any desired purpose. Of course, in some installations, the members 10, 20, of the fastening device may be in reversed position, if desired, depending upon which side of the secured parts is more readily accessible and the rotatable member of the fastening device most conveniently manipulated. In this respect, if the stud is fixedly secured to its associated part A, the spring locking plate 20 may be employed as the member which is rotated to provide the necessary relative rotation of said members 10, 20, for effecting the self-locking, threaded engagement thereof in applied fastening position, in the manner presently to be described.

The invention is disclosed in connection with an installation in which the parts A, B, to be secured are in the form of metallic platelike members having countersunk portions 1, 2, respectively, provided with openings receiving the shank of the bolt or screw fastening 10. Such countersunk portions are provided in the plates A, B, in complementarily spaced relation as necessary to receive the required number of bolt fastenings 10 employed with a similar number of locking plates 20 on part B. The countersunk portions 1 on part A are slightly smaller than the complementary countersunk portions 2 on part B in order to nest snugly therein and permit the parts A, B, to be brought into close, uniform contact in superposed relation, as shown in Fig. 1. Such nested countersunk portions thus serve as registering means for easily and quickly aligning said parts A, B, in proper assembled relation, while also allowing for limited adjustment of said parts in such assembled relation depending on the amount of clearance provided for between said countersunk portions in nested relation.

The stud fastening member 10 is rotatably disposed with respect to the cover plate or other part A by extending through the aperture in the countersunk portion 1 thereon to project from the rearward face of said part. The stud is provided with a head 11 which is snugly received in said countersink 1 in substantially flush relation with the outer surface of said part A in such a manner that the streamlined contour of the exterior of the aeroplane body or other part will be substantially smooth, even and uniform throughout. In the present example, the bolt or screw head 11 is shown provided with a simple form of tool recess 12 in which a screw driver may be engaged but it is quite obvious that other equivalent means may be employed for engagement by a wrench, pliers or other suitable tool. The shank of the bolt or screw is preferably of the type having a helical thread 13 of relatively high pitch on a root 14 formed with locking recess means in the manner of one or more notches or longitudinal grooves 15, spaced determinately thereabout.

The spring locking plate 20 is designed to cooperate with the stud 10 in the manner of a nut bearing on part B, which is usually at the rearward side of the installation. Said locking plate is a relative cheap article of manufacture in that it may be produced by simple stamping and forming operations from a comparatively small, inexpensive section of any suitable sheet metal, preferably of a spring metal nature, such as spring steel or cold rolled metal having springlike characteristics. The general construction of the locking plate is best seen in Fig. 8 and, of course, the same may be formed readily from sheet metal sections of various outlines, but from the standpoint of economical quantity production, is most advantageously provided from a generally rectangular blank obtained from ordinary sheet metal strip stock with a minimum loss or waste of material.

A preferred construction of said locking plate 20 embodies base flanges 21 on opposite sides of a substantially ball-shaped hub or boss 22 defined by a generally concavo-convex protuberance integrally formed from the body of the blank to project from the upper surface thereof. Said hub or boss 22 is provided of a size sufficient for the inner walls thereof to receive the nested countersunk portions 1, 2, in a manner whereby the base flanges 21 thereof may bear firmly and rigidly on the adjacent surrounding surface of part B. If desired, said hub or boss 22 may be made sufficiently large to provide a suitable clearance between the inner walls thereof and said nested countersunk portions 1, 2, in order to permit limited shifting of the locking plate for adjustment purposes in attached relation on said part B.

In the approximate center of said boss 22 a bolt opening is punched together with spaced parallel slits on either side thereof providing cooperating resilient stud engaging elements in the form of substantial tongues 24, 25, or the like, between side or bridge portions of the locking plate defined by the remaining sections of said boss 22 adjacent said tongues. Preferably said tongues 24, 25 are of such length as to extend from the base flanges 21 while the extremities thereof are shaped to lie on a helix corresponding substantially to the helix of the thread 13 on the bolt or screw 10. Inasmuch as the tongues 24, 25, are formed for the most part from the boss 22, and since said boss projects out of the plane of the blank body, said tongues are capable of being provided with an increased effective length in the manner of relatively long curved spring elements extending outwardly out of the general contour of the hub or boss 22 from which they are thus struck and formed.

Said tongues 24, 25 otherwise are disposed in inclined relation to each other and suitably curved longitudinally as necessary to dispose the extremities thereof on the desired thread helix, as aforesaid. In this respect, the extremities of said tongues 24, 25, preferably are formed in a substantially V-notched construction to define a series of thread engaging elements or prongs which may be readily bent and shaped as necessary to conform to the relatively high pitch of the bolt or screw thread 13. Preferably said tongues 24, 25, and the thread engaging prongs defined thereby are so arranged that, in normal untensioned relation, the opening between the tongue extremities is of a size slightly larger than necessary to admit the pilot portion of the screw 10 and permit the leading end of the screw thread 13 to be engaged easily and quickly with the lowermost prong in the initial step of rotating said screw to threaded fastening relation with said tongues 24, 25, as shown in Fig. 1.

On either or both of said tongues 24, 25, locking lugs or detents 26, 27, respectively, are provided in the bight between the associated pair of cooperating thread engaging elements or prongs defined by the extremities of said tongues. Said locking detents 26, 27, preferably are designed in the manner of substantial cam lips which are adapted to snap into and out of the longitudinal grooves or notches 15 of the bolt or screw fastener 10 as the same is rotated in threaded engagement with the tongue extremities. It will be understood that the said cam lips 26, 27, are so formed as to offer no obstruction or interference with the conventional threading relation of the tongue extremities with the bolt or screw especially when rotated by power tool force and in view of the fact said tongues 24, 25, are inherently resilient and capable of yielding as necessary to permit said lips to readily snap into and out of said longitudinal notches or grooves 15 of the bolt or screw during any rotation thereof in threaded engagement with said tongues either in tightening or loosening relation with the locking plate. If, to this end, it is necessary to increase the yieldability of said cam lips 26, 27, the same may be defined by relatively small slits or nicks 28 on either side thereof which permit said lips to flex readily and offer only such resistance to turning of the bolt or screw as may be found necessary or desirable. Said cam lips 26, 27 otherwise are so provided that the action thereof in such relation to the longitudinal grooves or notches 15 of the bolt or screw is in the nature of a pawl and ratchet effect as the cooperating fastening members are drawn taut, thereafter being positioned in one, two, or more of said notches or grooves 15 to positively lock said fastening members in finally tightened fastening position.

The spring locking plate 20 thus provided is designed to bear upon the outer face of part B which, for purposes of illustration, may be referred to as the rearward side of the installation and, in a blind location, often is not conveniently or readily accessible for holding the locking plate as the cooperating stud 10 is inserted and fastened therewith. In such instances, the locking plate preferably is permanently attached to said part B in any suitable manner as by rivets, eyelets or the like, 30, extending through openings 31 provided in the base flanges 21 of the spring locking plate as shown in Fig. 1. If desired, said openings 31 may be formed oversize with the rivets 30 provided with enlarged heads overlapping such openings in a manner to retain the locking plate in proper attached position on said part B but capable of limited sliding movement thereon for adjustment purposes relative to the nested countersunk portions 1, 2, and the screw 10 to be passed through the openings therein and threadedly engaged with the tongues 24, 25, of the spring locking plate. The spring locking plate, of course, may be employed in the manner of a rotatable nut device or otherwise, fixedly attached to the supporting part B by spot welding, or by attaching bolts or screws threadedly engaged with ordinary threaded nuts or applied to integral thread engaging elements struck and formed from the base flanges 21 of the locking plate and defining thread openings designed for threadedly engaging such attaching bolts or screws.

The spring locking plate is mounted on part B by its base flanges 21 through any such attaching means which otherwise, preferably are so provided that the exterior of said part B is a substantial plane surface against which the cooperating part A may be brought into close, uniform bearing engagement therewith, as illustrated in Fig. 1. The hub or boss 22 of the locking plate is disposed in overlying more or less concentric relation to the countersink 2 on part B while the opening between the extremities of the tongues 24, 25, is substantially aligned with the stud passage in said countersink 2 and capable of limited adjustment relative thereto by virtue of the enlarged openings 31 in the base flanges 21 permitting shifting of the locking plate with respect to the attaching rivets 30.

In use, it will be understood from the foregoing that when part A is superposed on part B as in the application of a cover plate to a service opening in the body of an aeroplane, the bolt or screw 10 is assembled with the part A and applied through the opening in the countersink 2 in part B into position for threadedly engaging the tongues 24, 25. The countersinks 1, 2, are disposed in loosely nested relation as the pilot portion of the screw is inserted into the opening between the tongue extremities. This causes any required shifting of the locking plate in its floating attachment on part B, as may be necessary to register the extremities of the tongues 24, 25, with the openings in the countersunk portions 1, 2, while otherwise centering the axis of the bolt or screw between the tongue extremities in position for even and uniform threaded engagement therewith.

To this end, the opening between the tongue extremities is preferably only slightly larger than necessary to admit the pilot portion of the screw 10, and accordingly, upon initial turning of said screw, the leading end of the thread 13 thereof readily engages and rides over the lowermost prong of the tongue 24. Upon further turning of the screw, the thread 13 successively engages the prongs on the tongue extremities at progressively increasing heights conforming to the inclination or helix of said thread 13 and forces the same into even, uniform threaded engagement therewith. Due to the relatively high pitch of the screw thread 13, the bolt or screw 10, may be quickly turned to tightened fastening position in which the resilient tongues 24, 25, thus disposed in uniform threaded engagement with said screw thread, are tensioned downwardly and thereby exert a pronounced axial spring force on the shank of the bolt or screw. This axial spring force takes place through the bending moment set up in the tongues 24, 25, in the tightened position of the bolt or screw which is produced by the downward pressure of the convolution of thread 13 finally engaged with the tongue extremities, and the upward reaction pressure of said tongues in attempting to assume their initial, untensioned condition.

As the bolt or screw is drawn up in such threaded relation with the tongues 24, 25, the cam lips or locking detents 26, 27 on the extremities thereof successively snap into and out of the notches or longitudinal grooves 15 of the bolt shank during the several revolutions thereof as necessary to advance the same to tightened fastening position, as illustrated in Fig. 1. In such tightened fastening position, the bolt is so located that the longitudinal grooves or notches 15 therein receive the locking lips or detents 26, 27 on the tongue extremities, substantially as shown in Figs. 1 and 2. Said detents 26, 27, thus disposed in the grooves 15, are adapted for abutting relation with the adjacent walls of said grooves and require at least a pronounced tool force on the bolt or screw to cause said detents to recede sufficiently for the same to be turned either in the direction for further tightening or in the reverse direction toward loosening. Said lips or locking detents 26, 27, thus serve to provide a positive locked relation of the bolt or screw, with the tongues 24, 25 in threaded engagement with the thread 13 thereof under continuously effective spring tension, as aforesaid, thereby eliminating any possibility of accidental loosening or intended unscrewing of the bolt or screw from finally applied fastening position, even under extreme conditions of shock, vibratory motion, and the like.

Quick and easy release of the secured parts may be effected simply by rotating the bolt or screw 10 under tool force in a reverse direction toward unscrewing whereupon the cam lips on locking detents 26, 27 are successively forced out of locking engagement in the notches or grooves 15 in the bolt shank and the extremities of said tongues 24, 25, otherwise ride upwardly against the helical bolt thread 13, thereby gradually relieving said tongues from their depressed, tensioned condition and finally permitting the bolt to be released from the spring locking plate substantially in a reversal of the foregoing described procedure.

It will be understood, of course, that the flexion or depression taking place in the tongues 24, 25, and the cam lips 26, 27 thereon, either in securing or releasing the cooperating fastening members, results in no permanent distortion or deformation of these elements, so that upon release of the fastening members from locked relation, as aforesaid, the spring locking plate automatically assumes its initial untensioned form ready for securing or coupling engagement with the bolt or screw member 10 in a repetition of the previously described procedure.

Figs. 4 and 5 show a further embodiment of the invention having an application and use similar to that just described but differing therefrom in that the locking detents or cam lips 35 are formed on the side or bridge portions 22 of the locking plate between the extremities of the tongues 24, 25. In the present example, a bolt or screw 10 substantially similar to that illustrated in Fig. 3 is shown employed together with the spring locking plate 20' having its side or bridge portions defined by the resilient boss sections 22 in a construction resembling that described with reference to Fig. 2. The extremities of the tongues 24, 25, may be provided in the preferred V-notched formation designed for even, uniform threaded engagement with the bolt thread 13 while said locking detents or cam lips 35 are adapted to snap into and out of the longitudinal notches or grooves 15 of the bolt or screw as the same is rotated toward tightened fastening position. Such V-notched tongue extremities in threaded engagement with the bolt thread 13 are designed to cut into and become embedded in the root 14 of the bolt shank, while said locking detents or cam lips 35 are located in the notches or longitudinal grooves 15, as shown in Fig. 5, to positively lock the bolt or screw against rotation in finally tightened fastening position, substantially in the manner described with reference to the form of the invention shown in Figs. 1 and 2.

Figs. 6–8, inclusive, disclose a further form of the invention similar in application and use to the previously described forms of the invention and embodying a bolt or screw 40 such as shown in Fig. 7 having a thread 43, preferably of relatively high pitch, provided on root 44 together with a plurality of spaced longitudinal ribs 45, or the like, adjacent the head 41 of said bolt or screw. The spring locking plate 20" is of the same general construction as the other forms of the invention and comprises the cooperating tongues or stud engaging elements 24, 25 between side or bridge portions defined by the resilient boss sections 22. On the edges of the boss sections adjacent said tongues, there are provided notches or indents 46 designed to receive the ribs 45 on the bolt or screw, as shown in Fig. 6, and otherwise cooperate with said ribs in a substantial pawl and ratchet action as the bolt or screw is rotated to its tightened fastening position.

It will be understood that the tongues 24, 25, extend out of the general contour of the boss sections 22 and are adapted to have full uniform threaded engagement with the bolt thread 43 prior to and during the time the ribs 45 are adapted to snap into and out of said notches 46 in the final tightening of the bolt or screw. The extremities of said tongues 24, 25, may also be provided in the preferred V-notched formation such that in the final tightening of the bolt or screw, the tongue extremities are in threaded engagement with the bolt thread 43 and adapted to cut into and become embedded in the root 44 of the bolt while the ribs 45 successively snap into and out of the notches 46 in the boss sections 22 of the locking plate and are finally located in said notches, substantially as shown in Fig. 6, to positively lock the bolt or screw in tightened fastening position in a manner similar to the previously described forms of the invention.

In some instances, added flexibility in the resilient boss sections 22 is required to provide for the desired pawl and ratchet effect of the ribs 45 in the notches 46 as described with reference to Fig. 6, or the similar action of the locking detents 35 in the notches 15 of the grooved bolt shank construction represented in Fig. 4. To this end, small holes 47, Figs. 6 and 8, may be punched at the extremities of the boss sections 22 adjacent the tongues, and this not only provides for any required added resiliency in said boss sections, but also facilitates the bending operation for forming the protuberances defining said boss sections 22 without danger of splitting, cracking or tearing of the metal on the free edge thereof at the junction with the base sections 21 of the locking plate.

In any form of the invention, similar compensating holes 47, may be provided as, for example, shown in Figs. 6 and 8, at the junction of the tongues 24, 25, with the body of the locking plate, such that in the bending operation for forming said tongues to project outwardly out of the plane of the base portions 21, there is eliminated any danger of splitting, cracking or tearing of the metal in the areas in which said tongues are integral with said base portions 21.

The spring locking plate in any form of the invention preferably is constructed of relatively thin sheet metal, the thickness of which is selected according to service requirements and the predetermined size of the parts secured. The spring locking plates are most effective when provided of spring metal suitably spring tempered and otherwise treated to give the desired toughness and hardness, particularly in the case of devices which are put to heavy duty in installations where extreme vibratory motion takes place. A cheap but effective locking plate may be provided from cold rolled metal, such as cold rolled steel, which is untempered but of a spring metal nature and preferably harder than that of the cooperating bolt or screw employed therewith in providing an effective and reliable fastening means adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a fastening device, a locking plate member comprising a sheet metal body provided with a protuberance having a stud opening and cooperating resilient stud retaining elements struck and formed therefrom to extend out of the general contour thereof, said stud retaining elements having generally V-shaped free ends defining a thread portion adjacent said stud opening, a stud member having a thread of relatively high pitch adapted to threadedly engage said free ends, said free ends being formed to lie on a helix corresponding substantially to the helix of said thread of relatively high pitch, said locking plate and stud constituting fastening members, one of said fastening members being provided with a locking detent and the other having a recess for receiving said detent and locking said members in such threaded securing relation.

2. In a fastening device, a locking plate member comprising a sheet metal body provided with a stud opening and cooperating resilient stud retaining elements provided from the material of said body and defining a thread portion adjacent said stud opening, a locking detent on one of said stud retaining elements, and a stud member having a thread for threadedly engaging said thread portion and a locking recess defined by a notch in the root thereof adapted to receive said locking detent on the stud retaining element to lock said stud and locking plate members in threaded securing relation.

3. In a fastening device, a locking plate member comprising a sheet metal body provided with a stud opening and cooperating resilient stud retaining elements provided from the material of said body and defining a thread portion adjacent said stud opening, a locking detent on said body integral therewith and adjacent the opening and carried independently of said thread portion, and a stud member having a thread for threadedly engaging said thread portion and a locking recess defined by a notch in the root thereof adapted to receive said locking detent to lock said stud and locking plate members in threaded securing relation.

4. In a fastening device, a locking plate member comprising a sheet metal body provided with a stud opening and cooperating resilient stud retaining elements provided from the material of said body, a thread portion defined by said stud retaining elements and a locking recess on said body adjacent said thread portion, and a stud member having a thread for threadedly engaging said thread portion and a locking detent defined by a rib or the like on the root thereof adapted to be received in said locking recess to lock said stud and locking plate members in threaded securing relation.

5. In a fastening device, the combination of a stud having a helical thread and a shoulder between the crests of adjacent thread turns and a fastening plate comprising a single strip of sheet material having an opening for the stud, the material of the plate being deformed about the opening to provide a helical edge to coact with the thread, said fastening plate having also a shoulder adapted to coact with the shoulder on the stud.

6. In a fastening device, the combination with a stud having a helical thread and a longitudinal shoulder, of a locking plate of sheet material having an opening and a pair of opposed tongues respectively on opposite sides of the opening bent from the body of the plate and having warped edges to coact with the thread of the stud, said plate being also formed with the shoulder to coact with the longitudinal shoulder on the stud and restrict the rotation thereof.

7. A fastening plate for use with a stud having a thread and shoulders on its shank between adjacent thread turns, said plate having an apertured protuberance defining an edge to coact with the thread and having also a shoulder adapted to coact successively with shoulders in the stud.

8. The combination with a stud having a helical thread and depressions between adjacent thread turns of a fastening plate comprising a strip of sheet metal having an opening for the passage of the stud with the material of the plate distorted about the opening to provide a helical edge to coact with the thread, said plate having also a lug adapted to occupy some of said depressions successively as the stud is screwed into the fastening plate.

9. The combination with a stud having a helical thread and longitudinal grooves about it of a fastening plate having an opening for the passage of a stud and a pair of tongues on opposite sides of the opening bent from the plate and warped to provide inclined struts, the ends of which defines a helical turn, said fastening plate having also a lug adapted to occupy said grooves successively as the stud is screwed into the thread space between the tongues.

10. A fastening plate for a stud which has a helical thread and longitudinal grooves, comprising a strip of sheet metal with an opening through it for the passage of a stud and a protuberance about the opening providing a helical edge to coact with the thread of the stud and a lug formed integrally with the plate adapted to occupy any of the grooves of the stud as it is screwed into place.

11. A fastening plate, for a stud having a thread and a series of longitudinal shoulders, comprising a strip of sheet metal having an opening for the passage of the stud and a pair of opposed tongues on opposite sides of the opening and a pair of reinforcing dome segments on opposite sides of the tongues extending across the opening, said segments being formed with shoulders on opposite sides of the opening to coact with the shoulders of the stud as it is screwed into place between the tongues.

12. The combination of a stud provided with a helical thread and shoulders spaced about the stud between the thread turns, of a fastening plate having an opening for the passage of the stud and a pair of tongues formed of the material of the plate bent therefrom at an acute angle thereto and having notches in their ends, said ends being warped to present a helical turn adapted to enter the thread groove and coact with the thread, and shoulders formed on the tongues adjacent the notches and adapted to coact successively with shoulders of the stud.

13. The combination with a stud having a helical thread and longitudinal grooves about it of a fastening plate having an opening for the passage of a stud and a pair of tongues respectively on opposite sides of the opening and bent from the plate and warped to provide inclined struts, the ends of which define a helical turn, the plate having a pair of bridge portions respectively on opposite sides of the opening, said fastening plate having also a lug on one of said bridge portions adapted to occupy any of said grooves as the stud is screwed into the thread space between the tongues.

14. A fastening device comprising a stud with a helical thread about its shank and a series of enlargements spaced about the shank of the stud and a fastening plate having an opening for the passage of the stud and a protuberance about the opening with a warped edge to engage the thread, said plate having a recess adjacent said opening adapted to coact successively with said enlargements as the stud is turned into place.

15. A fastening plate, for a stud having a thread and a series of longitudinal ribs adjacent the head of the stud, comprising a strip of sheet metal having an opening for the passage of the stud and a pair of opposed tongues on opposite sides of the opening and a pair of reinforcing dome segments on opposite sides of the tongues, said segments being formed with notches on opposite sides of the opening through the plate to coact with ribs of the stud as it is screwed into place between the tongues.

GEORGE A. TINNERMAN.